United States Patent
Scheuch

(10) Patent No.: US 7,300,481 B2
(45) Date of Patent: Nov. 27, 2007

(54) METHOD AND DEVICE FOR CLEANING FILTERS FOR DUST-LADEN WASTE GASES

(75) Inventor: Alois Scheuch, Ried im Innkreis (AT)

(73) Assignee: Scheuch GmbH, Aurolzmunster (AT)

( * ) Notice: Subject to any disclaimer, the term of this patent is extended or adjusted under 35 U.S.C. 154(b) by 202 days.

(21) Appl. No.: 10/482,887

(22) PCT Filed: Jul. 8, 2002

(86) PCT No.: PCT/AT02/00199
§ 371 (c)(1),
(2), (4) Date: Aug. 3, 2004

(87) PCT Pub. No.: WO03/008069
PCT Pub. Date: Jan. 30, 2003

(65) Prior Publication Data
US 2004/0261375 A1 Dec. 30, 2004

(30) Foreign Application Priority Data
Jul. 12, 2001 (AT) .................. 1091/2001

(51) Int. Cl.
*B01D 50/00* (2006.01)

(52) U.S. Cl. ............. 55/302; 55/283; 55/284; 55/337; 55/341.1; 55/372; 55/379; 55/459.1; 55/467; 55/472; 55/484; 95/134; 95/148; 95/280; 96/144; 96/146; 96/154; 96/427

(58) Field of Classification Search ............. 55/273, 55/302, 521, 324, DIG. 37, 341.1, 293, 283, 55/284, 337, 372, 379, 459.1, 467, 472, 484; 95/279, 280, 134, 148; 96/144, 146, 154, 96/427
See application file for complete search history.

(56) References Cited
U.S. PATENT DOCUMENTS
4,359,330 A * 11/1982 Copley .................. 96/426
(Continued)

FOREIGN PATENT DOCUMENTS
AT 377 711 9/1984
(Continued)

OTHER PUBLICATIONS
"Elektronische Regler und Steuergerate" (zur Abreinigungssteuerung von Filtern), Jun. 1994.
(Continued)

*Primary Examiner*—Duane Smith
*Assistant Examiner*—Minh-Chau T. Pham
(74) *Attorney, Agent, or Firm*—Merchant & Gould P.C.

(57) ABSTRACT

The invention relates to a method for cleaning filters for dust-laden waste gases, including several filter elements (2) which are arranged vertically in a filter housing (1) and which have an upper open end (16) and a lower closed end (15) with at least one feed line (9) for the dust-laden waste gases and at least one discharge line (11) for the cleaned waste gases, in addition to a device for injecting surges of compressed air into the open end (16) of the filter elements (2). In order to reduce pressure fluctuations in the filter and to provide efficient cleaning with pulsations of compressed air in the low pressure range i.e. from approximately 0.8 to 3 bars, the filter is divided into several filter modules (1) respectively including at least one filter element (2). At least two filter modules (1) are arranged in a filter housing (10) or a filter chamber. The filter modules (1) are cleaned alternately and each filter module (1) is associated with a discharge line (11) with a shut-off element (3) for the clean gas. A control device (19) is provided for the shut-off elements (3), whereby when the filter modules (1) which are to be cleaned are changed, the shut-off element (3) of the cleaned filter modules (1) is open and the shut off element (3) is closed in a diametrically opposed manner for the filter module (1) to be cleaned. As a result, any pressure fluctuations in the filter are minimised.

16 Claims, 3 Drawing Sheets

U.S. PATENT DOCUMENTS

| | | | | |
|---|---|---|---|---|
| 5,837,017 A | * | 11/1998 | Santschi et al. | 55/302 |
| 5,948,127 A | * | 9/1999 | Minakawa et al. | 55/283 |
| 5,948,143 A | * | 9/1999 | Sjostrom et al. | 95/134 |
| 6,022,388 A | * | 2/2000 | Andersson et al. | 55/302 |
| 6,077,490 A | * | 6/2000 | McIlroy et al. | 423/215.5 |
| 6,136,072 A | * | 10/2000 | Sjostrom et al. | 95/134 |
| 6,676,721 B1 | * | 1/2004 | Gillingham et al. | 55/302 |
| 2003/0089234 A1 | * | 5/2003 | Bjarno et al. | 95/280 |

FOREIGN PATENT DOCUMENTS

| | | |
|---|---|---|
| AT | 405 615 | 3/1999 |
| AT | 407 8840 | 11/2000 |
| DE | 1757 515 | 6/1971 |
| DE | 23 45 722 | 3/1975 |
| DE | 27 09 204 | 9/1978 |
| DE | 27 25 438 | 12/1978 |
| DE | 28 31 167 | 6/1980 |
| EP | 0 080 754 | 6/1983 |
| EP | 0 813 897 | 12/1997 |
| JP | 06-233908 | 8/1994 |

OTHER PUBLICATIONS

Produktinformation "Informationen uber INTENSIV Jet Ruckspulfilter-Off Line" mit zugehorigen Datenblatter (10 Seiten), Dec. 1989.

Prospektunterlagen "Jet-Ruckspulfilter", 92.131, 92.132, 91.127 und 92.134, Mar. 1992.

D10.1: Produktinformation"Informationen uber INTENSIV Jet Ruck-spulfilter-Off Line" mit zugehorigen Datenblattern (10 Seiten).

D10.2: Prospektunterlagen "Jet-Ruckspulfilter", 92.131, 92.132, 91.127 und 92.134.

D.10.3: Dokumentationsunterlagen vom 2. Oktober 1991 einer 1992 in Italien in Betrieb genommenen Filteranlage vom Typ IFR 55/7-3 mit einem zugehorigen Messbericht 0888/92 datiert auf den 7. September 1992 und.

D10.4: Dokumentationsunterlagen vom 20. Marz 1992 einer im Jahr 1992 erweiterten Filteranlage vom TYP IFJR 70/13-3 in Meitingen-Herbertshofen sowie ein Messbericht 1595/98 uber die Uberprufung der Betriebsdaten dieser Filteranlage datiert auf den 24. September 1998.

* cited by examiner

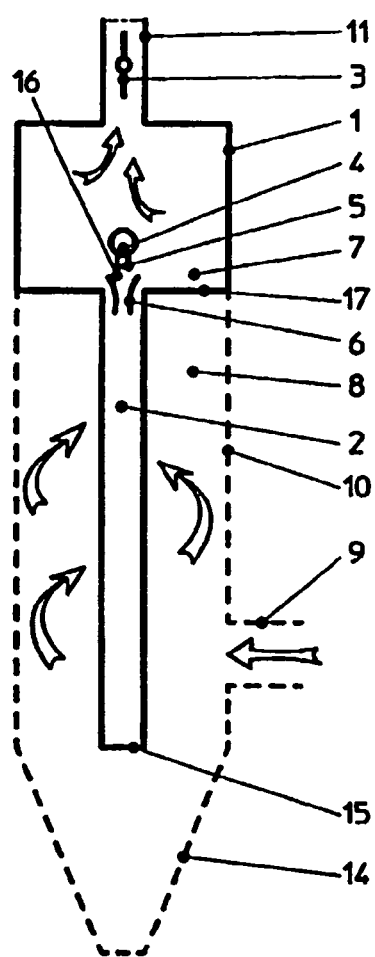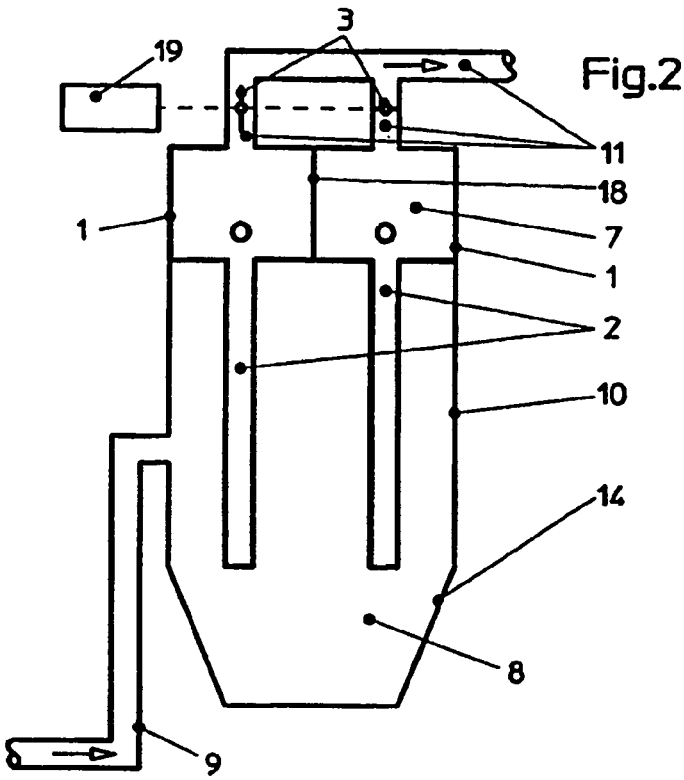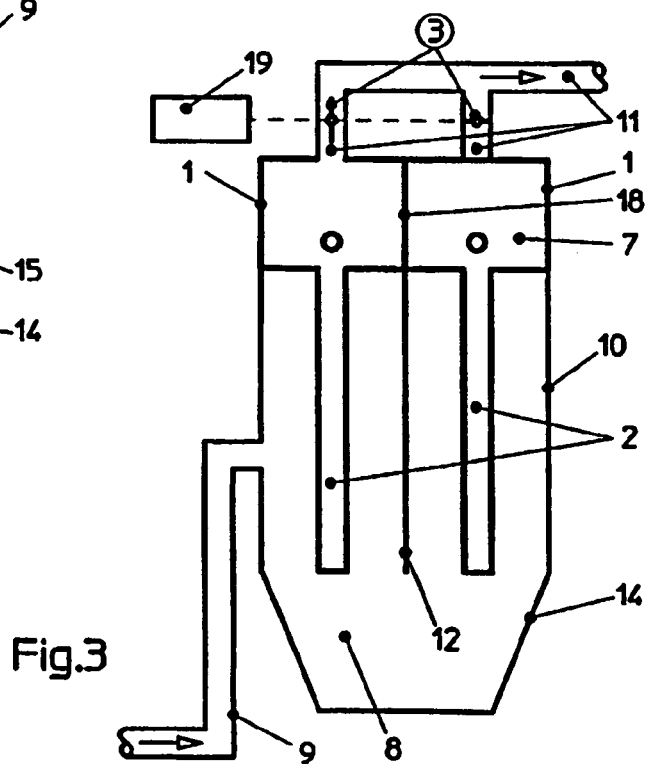

METHOD AND DEVICE FOR CLEANING FILTERS FOR DUST-LADEN WASTE GASES

BACKGROUND OF THE INVENTION

The invention relates to a method and device for dedusting filters for dust-laden waste gases, including several vertically arranged filter elements each having an upper, open end and a lower, closed end, wherein the waste gases flow through the filter elements from outside and the cleaned waste gases are discharged through the open ends of the same, and wherein for dedusting compressed-air blasts are blown into the open ends of the filter elements to be dedusted.

Filters for dust-laden waste gases are used where impurities such as as chips, shreds, fibers or dusts are to be separated from a conveying air and disposed of or recycled. Examples of industrial branches where lots of dust occur include the wood-processing industry, fiber industry, paper industry or petroleum industry. Impurities are, for instance, sucked off the location of a processing machine, and the polluted waste gases, which are referred to as crude gases, are supplied to the filter. A filter, as a rule, is comprised of several filter elements, which may be designed as filter hoses, filter cartridges, filter bags or even filter plates. The crude gas to be cleaned flows through the filter medium from outside towards inside, whereby the impurities and, in particular, dust and aerosol particles are separated on the outer side of the filter element. The purified gas stream leaves the filter element through the upper, open end into a so-called clean-gas chamber and through appropriate ducts reaches consecutively arranged plant components or escapes into the atmosphere.

In the course of time, the deposit formed on the outer walls of the filter elements, which is called filter cake, becomes thicker and thicker, for which reason the filter must be periodically dedusted in order to guarantee the continuous operation of the same. To this end, air is blown in through the open end of the filter element in order to separate the impurities adhering to its outer side. In doing so, dedusting is effected either by a continuing scavenging-air flow or by a short and vigorous compressed-air blast. The advantages of the scavenging-air method reside in a lower pressure of the dedusting air flow and the low mechanical stresses thus exerted on the filter material. Yet, it is disadvantageous that large amounts of scavenging air are required to efficiently remove the filter cake. The presence of movable parts within the dedusting mechanism involves further drawbacks. Moreover, the dedusting effect will be particularly insufficient with critical or tacky dusts as well as high hose resistances. The high volume flows required as well as additional measures such as, for instance, the heating of the scavenging air for hot-gas filtration bring about further economic disadvantages.

By contrast, the compressed-air method offers the advantages that no moving parts are required within the dedusting mechanism and that the method functions well with critical dusts and high hose resistances, leading to optimum dedusting results. Further advantages would include low energy demands, low volume flows of compressed air and no preheating of the dedusting air necessary for hot-gas filtration in order to avoid lower deviations of the dew point. The disadvantages involved in compressed-air methods include high pressures prevailing in the pressure reservoirs as well as thus caused high mechanical loads exerted on the filter medium and hence reduced service lives of the filter elements. In addition, the throwing off of dust particles from a filter element is likely to cause suction through the adjacent filter element, for which reason no sustained removal of the filter cake will be achieved. A device for dedusting filter hoses or filter cartridges by blowing compressed air into an injector nozzle is, for instance, described in AT 377 711 B.

In the dedusting of filters of the initially defined kind, it is distinguished between what is called online dedusting, which is effected without any shutdown of the plant, and so-called offline dedusting, during which a short-term interruption of the circulation is effected. In online dedusting air is blown into individual filter elements, or compressed-air blasts are fed to the latter, during the operation of the filter plant, while the operation of the remaining filter elements is kept going.

Since part of the energy is lost through the upper, open end of the filter element during the dedusting of a filter element such as, e.g., filter hose, methods enabling higher dedusting rates have been developed by at least partially covering during dedusting the open ends of the filter elements to be dedusted, so that the filter element to be dedusted will be more or less free of pressure. Such a device for the successive dedusting of hose filters is, for instance, described in AT 407 840 B.

Another method and device for cleaning a dust separator is described in AT 405 615 B, wherein, in order to ensure a good cleaning effect, the filter elements to be dedusted are blocked on the clean-gas side and swept around by a directed crude-gas flow during dedusting such that the throwing-off of the filter cake from the filter element to be dedusted will be assisted by said crude-gas flow. That method involves the drawback that during dedusting a certain extent of polluted crude gas will sweep around the filter element to be dedusted. Consequently, the applied pressure of the compressed air used for dedusting must be raised, or a poorer dedusting effect will have to be taken into account. The crude-gas flow also causes the filter cake thrown off the dedusted filter element to be conveyed to other filter elements, where it is again sucked in rather than caused to drop into the dust collection funnel by the shortest way possible.

A further disadvantage of known dedusting methods consists in that pressure fluctuations will occur in the filter, or in the overall plant, due to the switching on and off of the filter elements before and after dedusting. Heavy pressure deviations that may affect the whole system are particularly caused during the switching on of a dedusted filter element, or a filter chamber comprised of several filter elements just dedusted. The control of the fan or the like, which is responsible for the discharging of the clean gas, can thus, for instance, fall out of step by sudden pressure changes. Due to the inertia of the fan, pressure deviations cannot be immediately compensated for and hence may lead to vibrations. On the other hand, changes in the pressure difference between the filter plant and its surroundings may also occur on the site of origin of the dust-laden waste gases, for instance in a processing machine or mill or the like, whereby an air flow in the opposite direction of the suction plant may even be caused.

DE 23 45 722 A1 describes a gas filter in which a dedusting nozzle extends over the entire length of the mouths of the filter elements and is attached to a movably arranged nozzle carriage. That arrangement does not comprise several filter modules arranged in a common housing and does not disclose any measures to minimize pressure deviations during the dedusting of filter modules.

DE 27 09 204 A1 describes a method for cleaning flowing gases and a corresponding device in which compressed air is blown into the filter elements in at least two separate pulses, the first pulse serving to loosen the filter cake and the subsequent pulse serving to blast the same off the filter hose.

DE 27 25 438 A1 discloses a method and device for the blow-back proof compressed-air blast cleaning of filter elements, in which an elastically designed membrane valve is arranged on the mouth of the filter body. By hermetically sealing off the open filter hose during dedusting, it is ensured that the compressed air will become fully effective during dedusting, yet pressure deviations in the filter are not minimized.

Finally, DE 28 31 167 A1 shows a filter comprising filter elements arranged within a chamber, wherein during the dedusting of a chamber the latter is locked both on the crude-gas side and on the clean-gas side, thus enhancing the dedusting intensity. The closure of both the crude-gas-side flap and the clean-gas-side flap calls for the use of an overflow valve during dedusting in order to relieve the overpressure prevailing in the closed chamber. A high pressure within the housing would reduce the dedusting effect of a compressed-air blast or of the scavenging air. That arrangement is characterized by high construction expenditures.

SUMMARY OF THE INVENTION

It is the object of the present invention to provide a method and device for dedusting filters for dust-laden waste gases, by which pressure deviations in the system can be minimized to the largest extent possible while, at the same time, rendering feasible the sustained removal of the filter cake, the application of as low a pressure as possible for the compressed air used for dedusting, and the consumption of a small compressed-air volume. The expenses involved in the method and device according to the invention are to be kept as low as possible so as to also minimize production and installation costs.

The object according to the invention in method terms is achieved in that at least one filter element is each arranged in a filter module and that at least two filter modules are each arranged in a housing or filter chamber, whereby the filter modules are alternately dedusted with the filter module to be dedusted being set in a substantially flow-free state during dedusting by interrupting, during dedusting, the clean-gas discharge duct of the filter module to be dedusted and effecting the connection of the dedusted filter module to, and the disconnection of the filter module to be dedusted from, the gas flow in a diametrically opposed manner at a changeover of the filter modules to be dedusted, thus enabling the minimization of any possible pressure deviations in the filter. By subdividing the filter into filter modules and bringing the filter module during dedusting into a substantially flow-free state, offline dedusting of the filter module can be ensured without requiring the usual chambered mode of construction of filters, which involves a large number of supply ducts, discharge ducts and partition walls. Here, the complete separation of the filter modules to be dedusted from the crude-gas flow is not sought, because this would imply elevated construction costs as with the chambered mode of construction. Moreover, it is advantageous that the crude-gas supply duct remains open during the dedusting of a filter module, so that the pressure wave propagating during dedusting can propagate via the crude-gas duct rather than causing an excessive pressure to build up in the filter module or filter housing, respectively. Due to the diametrically opposed connection of the dedusted filter module to the gas flow, and the disconnection of the filter module to be dedusted from the gas flow, as provided by the invention, pressure deviations in the filter as well as in the overall plant are minimized and the overall pressure situation is stabilized. Consequently, low pressures may be applied for the dedusting of the filter elements while nevertheless ensuring the effective removal of the filter cake. By the respective filter module being in a substantially flow-free state during dedusting, dedusting and the throwing-off of the filter cake will not be affected and the sedimentation of the thrown-off filter cake will not be hampered, either. The substantially flow-free state of the filter module is obtained during dedusting by the interruption of the clean-gas discharge of the filter module to be dedusted, which may, for instance, be effected by conventional shutoff means such as various types of valves. Because of the use of compressed-air blasts in the low-pressure range, the energy required for such compressed air blasts is minimized and also the volume of the compressed air consumed is kept low. Furthermore, the modular mode of construction involves fewer technical expenditures and hence fewer production costs. Another consequence of the stable pressure conditions is the relatively uniform amount of dust occurring, which has positive effects on the subsequent treatment of the same, since, for instance, the discharging means such as, e.g., screw conveyors or conveying devices, will not be differently stressed and hence will not require different activation. The order of filter module dedusting can be chosen at will. The filter elements within a filter module can be provided with compressed-air blasts either simultaneously or consecutively, said order being likewise arbitrarily feasible with a large number of filter elements.

For dedusting, compressed-air blasts at a reservoir or receiver pressure of 0.5 to 3 bar, preferably 0.8 to 2 bar, are used. With this type of dedusting, the compressed-air volume per dedusting pulse is preferably 0.5 to 4 liters per $m^2$ of filter area. By comparison, conventional online operation is run at reservoir pressures ranging from 3 to 10 bar. In doing so, the consumption of compressed air for each pulse is 4 to 20 liters per $m^2$ of filter area. The respective pressures of the compressed-air blasts depend on the respective lengths of the filter elements. The indicated values are typical of filter hoses having lengths of more than 4 m. By reservoir or receiver pressure, the pressure prevailing in the pressure tank or in the compressed-air supply duct rather than the pressure prevailing at the nozzle above the open end of the filter element is understood, which, as a rule, is substantially lower than the reservoir or receiver pressure. In addition to reduced energy costs, the saving of filter elements and the reduction of pressure fluctuations in the filter and overall system are feasible with lower pressure values.

In order to further reduce the energy on the one hand and keep the load on the filter elements as low as possible on the other hand, only one compressed-air blast is used for each filter element of the filter module per dedusting cycle for the dedusting of each filter module.

In order to achieve the optimum dedusting effect, it is provided that the compressed-air blasts are directed in the direction of the filter elements. This can be ensured by certain structural measures such as, e.g., compressed air nozzles provided above the open end of the filter element or injectors arranged in the open end of the filter element, or similar.

In order to minimize the necessary volume of compressed air, it is provided according to a further characteristic feature of the invention that the compressed-air blasts have a duration of less than 300 ms. By duration, the electric opening time of the respective valve for the compressed-air nozzle is to be understood rather than the mechanical opening time of the valve, which usually deviates slightly from the former.

If the filter module to be dedusted is left in the substantially flow-free state for a certain period of time after dedusting, the sedimentation of the thrown-off filter cake will be enhanced and supported, since a new suction of the impurities descending towards the dust collection funnel will be prevented, if the impurities are given enough time to descend into the dust collection funnel.

The object according to the invention is also achieved by a device for dedusting filters for dust-laden waste gases, including several filter elements vertically arranged in a filter housing and each having an upper, open end and a lower, closed end, at least one supply duct for the dust-laden waste gases and at least one discharge duct for the cleaned waste gases as well as a means for blowing compressed-air blasts into the open ends of the filter elements, wherein the filter is subdivided into several filter modules each comprising at least one filter element and at least two filter modules are arranged in a filter housing or filter chamber, said filter modules being alternately dedusted, and wherein each of said filter modules is each associated with a clean-gas discharge duct in which a shutoff means is provided for the interruption of the clean-gas discharge duct, and a device for controlling the shutoff means is further provided so as to effect in a diametrically opposed manner, during a changeover of the filter modules to be dedusted, the opening of the shutoff means of the already dedusted filter module and the closure of the shutoff means of the filter module to be dedusted, thus enabling the minimization of possible pressure deviations in the filter. If the clean-gas flow is interrupted, no crude-gas flow will sweep around the associated filter module, thus enabling a lower pressure to be applied for the dedusting of the filter element without any deterioration of the dedusting effect. It is only this measure that allows the compressed-air-blast-based dedusting method to be used in the low-pressure range, i.e., between 0.5 and 3 bar while safeguarding high separation rates at the same time. Due to the fact that the filter element to be dedusted is in a substantially flow-free state, the throwing off of the filter cake from the filter element, particularly from the outer wall of the filter hose, is not impeded and the filter cake is able to drop down into the dust collection funnel substantially by the shortest way without being conveyed by the crude-gas flow to adjacent filter elements and depositing there anew. The advantages are that dedusting need not be effected against the pressure of the crude-gas flow and can, thus, take place at a lower pressure and a reduced volume flow. This enables the sustained removal of the dust cake. As opposed to known filter chambers, construction expenditure are lowered by the present invention due to the subdivision into filter modules. In addition, the diametrically opposed opening of the shutoff means of the already dedusted filter module and the closure of the shutoff means of the filter module to be dedusted ensure that the resulting pressure deviations will be minimized both in the filter and in the overall system.

According to a variant embodiment, each the filter modules is comprised of a chamber forming the clean-gas space and including a connection to the clean-gas discharge duct as well as a connection to the at least one filter element. Such an embodiment is made up of but few structural components and can be readily and quickly incorporated and installed in existing filter housings. As opposed to known filter chambers, costs can, thus, be markedly reduced.

The advantages will be further enhanced in that partition elements are arranged between the or some filter modules located within the filter housing. It is thereby rendered more readily feasible to reach the flow-free state of the filter module to be dedusted and additionally prevent the adherence of the filter cake to the filter elements of adjacent filter modules arranged in a filter housing.

In order to ensure the guidance of the compressed-air blasts into the open ends of the filter elements, at least one nozzle oriented in the direction of the filter element is arranged above the open end of each filter element according to a further characteristic feature of the invention.

Even better conditions will be reached in that two nozzles oriented in the direction of the filter element are arranged eccentrically above the open end of each filter element.

Further improvements of the cleaning effect will be obtained if an injector is arranged in the open end of each filter element. The enhanced flow conditions, in turn, allow for the application of low-pressure compressed-air blasts, which will save both energy and the filter elements.

In an advantageous manner, the at least one nozzle is arranged above the open end of each filter element at a distance from the entry opening of the injector.

If, in accordance with a further characteristic feature of the invention, the at least one waste-gas supply duct is arranged below the lower end of the filter elements of the filter modules, a substantially flow-free state of the filter module to be dedusted will be obtained by shutting off the clean-gas duct without requiring several crude-gas supply ducts for each filter module.

BRIEF DESCRIPTION OF THE DRAWINGS

The advantages of the method according to the invention and exemplary devices for carrying out said method will be explained in more detail with reference to the accompanying drawings. Therein:

FIG. 1 is a schematic view of an embodiment of a filter module;

FIG. 2 is a sectional illustration of an embodiment of a filter;

FIG. 3 is a sectional illustration of a filter variant;

DETAILED DESCRIPTION OF THE PREFERRED EMBODIMENT

Figure 4:
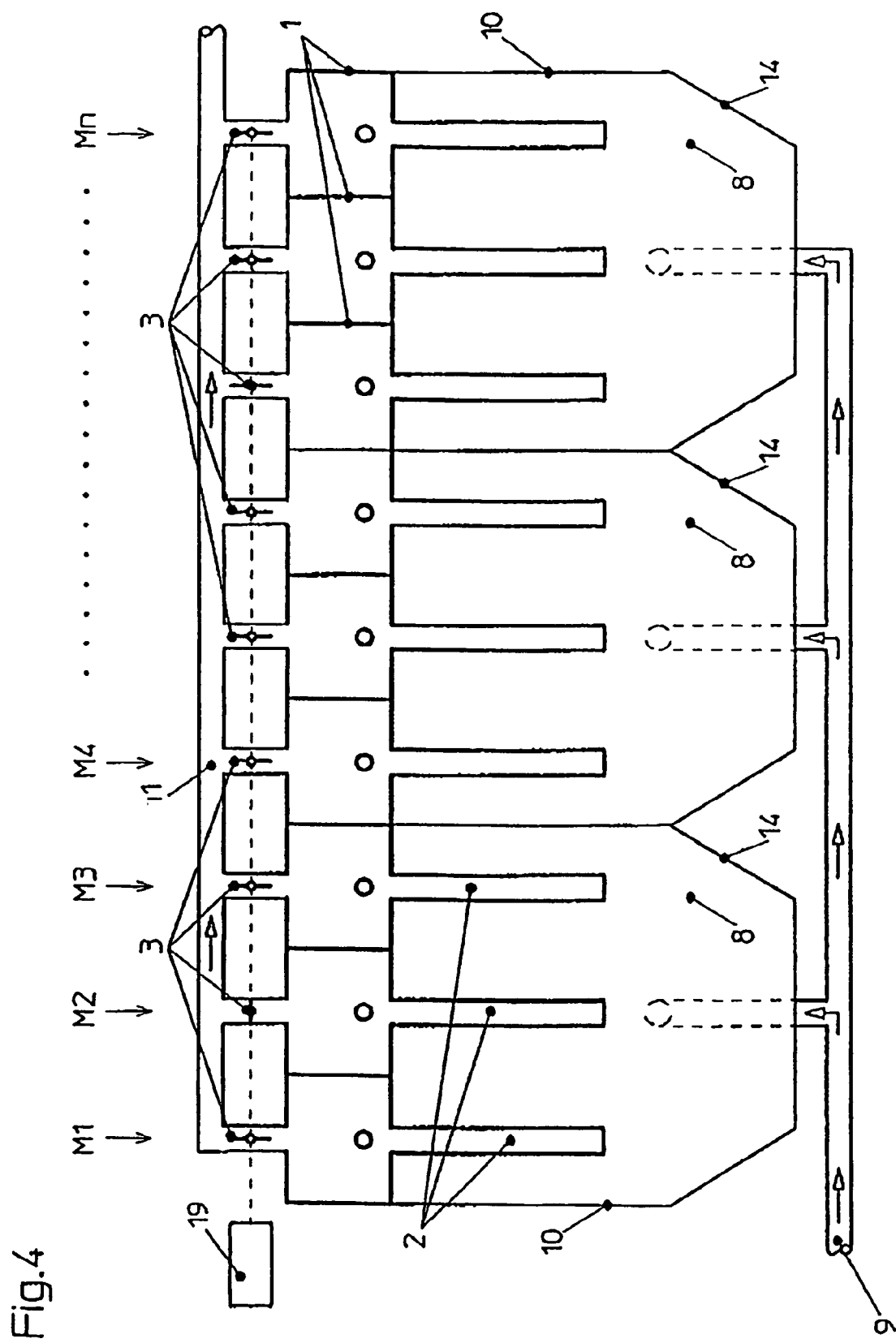
FIG. 4 is a sectional illustration of another filter variant.

FIG. 1 shows a filter module 1, in which at least one filter element 2 comprised of a filter hose is arranged. As a rule, a row of filter elements 2, or even several rows of filter elements 2, are arranged in a filter module 1. Each one of said filter elements 2 is vertically arranged and comprises a closed, lower end 15 as well as an open, upper end 16. Each one of said filter elements 2 is suspended in an opening of a plate 17 that separates the crude-gas space 8 from the clean-gas space 7, the crude-gas flow introduced into the filter housing 1 through a supply duct 9 flowing through each of said filter elements from outside towards inside. The impurities contained in the crude-gas flow remain adhered to the outer walls of the filter elements 2, forming a filter cake that will grow over time. The cleaned crude gas reaches the clean-gas space 7 via the upper, open end 16 of the filter element 2, and from there flows to consecutively provided plant parts, or into the atmosphere, via a suitable discharge duct 11. A propulsion jet tube 4 is arranged above each row of filter elements 2 to remove the filter cake adhering to the filter elements 2, said propulsion jet tube 4 being connected with the respective pressure tank 4b via a shutoff valve 4a. This pressure tank is the reservoir or reception vessel. The propulsion jet tube 4 comprises an opening formed by one or several nozzles 5 above each open end 16 of each filter element 2. During the dedusting procedure, a compressed-air jet expands from this nozzle 5 above the clean-gas space 7 into an optionally provided injector 6, into the interior of the filter element 2. The compressed air emerging from the nozzle 5 creates a pressure wave along the longitudinal axis of the filter elements 2 in the direction of the closed end 15. Within the injector 6, a mixture of primary air and secondary air is created by pulse exchanges. At the same time, this mixture is imparted a pressure increase within the injector 6. At the emergence from the injector 6, of the mixture comprised of primary and secondary air, a pressure wave is formed along the longitudinal axis of the filter elements 2 in the direction of the closed end 15 of the filter elements 2. At first, a pressure backup is created there, because the dedusting air impinges on the closed ends 15 of the filter elements 2, which are frequently protected by metal caps, and is rebound from the same. The returning pressure wave inflates the filter elements 2. Due to the suddenly occurring pressure change and the reversal of the flow direction, the filter elements 2 plus filter cake are accelerated towards outside with a sudden retardation taking place as the maximum expansion of the filter element 2 is reached, whereby the filter cake is separated from the outer walls of the filter elements 2 and pops off the same. The thrown-off filter cake 10 drops into a dust collection funnel 14 downwardly connected to the filter housing 10 surrounding the filter module 1 and there is carried off, for instance, by means of a screw conveyor. If several rows of filter elements 2 are arranged within a filter module 1, these can be powered by compressed-air pulses either simultaneously or at short time delays of, for instance, 3 seconds. In doing so, it is advantageous to not only power one row of filter elements 2 after the other, but to mix the order of rows of filter elements 2 so as to assist sedimentation.

FIG. 2 is a sectional side view of an embodiment of the invention, wherein two filter modules 1 each comprising at least one filter element 2 are arranged in a filter housing 10. On account of the mode of construction of the filter modules 1 described in FIG. 1, it is feasible to use existing filter housings 10 by simply and rapidly inserting the filter modules 1 into the same. Via a supply duct 9, the crude gas is fed into the crude-gas space 8 of the filter. The clean-gas space 7 follows upon the upper, open ends 16 of the filter elements 2 and is subdivided by a partition wall 18. From each part of the clean-gas space 7, a discharge duct 11 for clean air leads to further plant components or into the atmosphere. A shutoff means 3 is provided in each of the discharge ducts 11 to block the clean-gas discharge duct. The shutoff means 3 of the discharge ducts 11 are connected to a control device 19. That device 19, which in most cases is comprised of a computer, controls and regulates the opening and closing of the shutoff means 3 of all filter modules 1. In accordance with the invention, the filter module 1 to be dedusted is switched into a flow-free state at least during dedusting by closing the shutoff means 3 of the respective discharge duct 11. This causes the flow from the crude-gas space 8 to the clean-gas side to be interrupted and the associated filter module 1 to assume its flow-free state. In order to ensure the optimum sedimentation of the removed filter cake from the filter elements 2 of the dedusted filter module 1, the shutoff means 3 may remain closed for a certain period of time upon completion of dedusting, thus facilitating the descent of the filter cake down to the dust collection funnel 14. After dedusting of the filter elements 2 of the respective filter module 1 has been completed, another filter module 1 is being dedusted, while the already dedusted filter module 1 is again available for filtering, thus permitting the continuous operation of the filter. In accordance with the invention, the opening of the shutoff means 3 of the already dedusted filter module 1 and the closing of the shutoff means 3 of the filter module 1 to be dedusted are controlled in a diametrically opposed manner so as to minimize possible pressure deviations in the filter. The control implemented in the device 19 serves to ensure that always exactly one filter module for dedusting will be switched off the gas flow such that the system will not be adversely affected by pressure deviations. For an explanation of the timing, it is referred to the time-dependent diagrams depicted in FIG. 5 as well as the pertinent description.

FIG. 3 illustrates a variant of a filter according to the invention, in which a partition wall 12 is provided in the crude-gas space 8 between the filter modules 1, or rows of filter elements 2 of the filter module 1, respectively. This partition wall 12 prevents the filter cake from being sucked in by the adjacent row of filter elements 2 and facilitates the sedimentation of the removed filter cake in the direction towards the dust collection funnel 14. Because of the single supply duct 9 provided for the crude gas, the construction expenditure are still low as compared to conventional filter designs in the form of individual chambers, every filter chamber having to include all the necessary structural components. With a larger number of filter modules 1 arranged in a filter housing 10, partition walls need not be provided between all of the filter modules 1, but only between some of the filter modules 1.

FIG. 4 is a sectional illustration of another variant of a filter, wherein filter modules 1 according to FIG. 1 are installed in a filter housing 10 which is subdivided into three chambers. Three filter modules 1 are used in each filter chamber. Each of the filter modules 1 may be comprised of a filter element 2 or rows of filter elements 2. The discharge ducts 11 for the clean air are combined to a common duct. Apart from that, no cumbersome mounting operations are necessary. The shutoff means 3 provided in the discharge ducts 11 of each filter module 1 are connected to a control and regulation device 19, which may, for instance, be realized in the form of a computer. In the example illustrated, the shutoff means 3 of the second filter module 1, which is denoted by M2, is shut off so that the filter elements 2 of the filter module M2 are in the flow-free state. Via the propulsion jet tube 4 provided above the filter elements 2 of the filter module M2, a compressed-air pulse is sent into the filter elements 2, and the shutoff means 3 is kept in the closed position for a certain period of time such that the filter cake thrown off the filter element 2 can descend into the dust collection funnel 14 and be carried off the same. After this, the shutoff means 3 of the filter module M3 is closed and, at the same time, the shutoff means 3 of the filter module M2 is opened in a diametrically opposed manner. The order of dedusting of the filter modules 1 need not necessarily be one after the other, but may be distributed over all of the filter modules 1 of the filter according to a predefined scheme. The timing of the dedusting procedure according to FIG. 4 is explained in more detail in FIG. 5.

Figure 5:
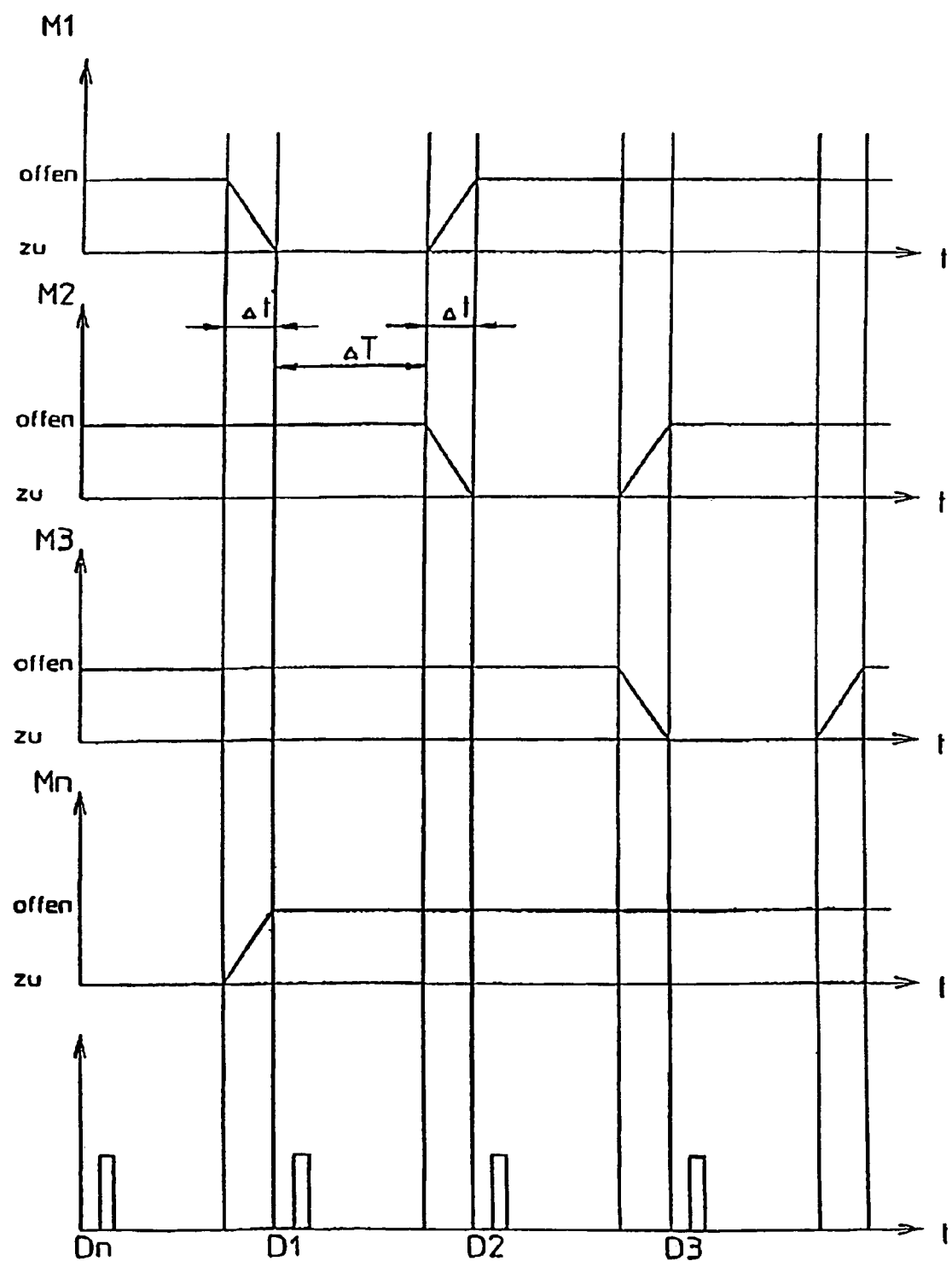
FIG. 5 depicts time-dependent diagrams of the shutoff means of the filter modules of a filter to illustrate timing.

FIG. 5 shows time-dependent diagrams for the control of the shutoff means 3 of n filter modules 1 provided in a filter. By closing the shutoff means 3, the filter module M1 is switched off the crude-gas flow at a certain instant and brought into a substantially flow-free state. The closing of the shutoff means 3 of the filter module M1 is effected during an interval Δt, as illustrated in FIG. 5 in the uppermost time-dependent diagram. The shutoff means may, for instance, be realized by disc valves or butterfly valves, which are connected with a control device 19. It should be noted that the process of opening and closing the shutoff means 3 need not necessarily be linear as illustrated, but, as a rule, will rather deviate from linearity. As soon as the filter module M1 has been set into a substantially flow-free state, a compressed-air pulse is sent into the filter element(s) 2 of the filter module M1. The compressed-air pulse for the filter elements of the filter module M1 is denoted by D1 in the lowermost time-dependent diagram of FIG. 5. After the filter module M1 has been dedusted, it is still left in the flow-free state for a certain period of time so as to promote the sedimentation of the thrown-off filter cake. After this, the filter module M1 is reset into the crude-gas flow by appropriately opening the associated shutoff means, thus annulling the substantially flow-free state. Such opening of the shutoff means again involves a certain time interval Δt. During the opening of the shutoff means of the filter module M1, the shutoff means of another filter module M2 is closed in a diametrically opposed manner so as to provide a gliding transition of the filter modules and reduce any pressure deviations occurring in the system. It goes without saying that certain tolerances in the timing of the shutoff means are permissible, anyway. As soon as the filter module M2 has reached its flow-free state, a compressed-air pulse D2 is sent into the filter elements of the filter module M2, and upon expiration of a certain phase aimed to assist sedimentation the shutoff means of the filter modules M2 is re-opened. Simultaneously with the opening of the shutoff means of the filter module M2, the shutoff means of a further filter module M3 is closed, whereupon said filter module M3 is dedusted. This process is continued until the last filter module Mn has been dedusted, whereupon the process is started anew, for instance, with filter module M1. As already pointed out above, the order of the dedusting of filter modules M1 to Mn is not critical. Changing conditions such as, for instance, elevated amounts of dust-laden waste gases can be responded to by reducing the time intervals Δt between the shutoffs of the individual filter modules. By controlling the shutoff means of the individual filter modules M1 to Mn, as provided by the invention, uniform pressure conditions will be obtained throughout the system. The stable pressure state prevailing in the system, moreover, results in regularly produced amounts of impurities so that the discharge means will be uniformly charged with dedusted material and the discharge means such as, e.g., screw conveyors need not be equipped with complex control means.

The invention claimed is:

1. A method for dedusting filters for dust-laden waste gases, the filters comprising a plurality of vertically arranged filter elements each having an upper, open end and a lower, closed end, wherein the dust-laden waste gases flow through the filter elements and cleaned waste gases are discharged through the open ends to a clean-gas discharge duct; the method comprising: blowing compressed-air blasts at a reservoir or receiver pressure of 0.5 to 3 bar into the open ends of the filter elements, wherein the consumption of the compressed air used for dedusting is 0.5 to 4 liters per m² of filter area, wherein at least one filter element is each arranged in a filter module and at least two filter modules are each arranged in a filter housing or filter chamber, wherein a selected filter module to be dedusted is set in a substantially flow-free state during dedusting by interrupting a clean-gas discharge duct of the selected filter module while simultaneously re-instating the connection of a previously dedusted filter module to the clean-gas discharge duct during a change-over of the filter module to be dedusted, enabling the minimization of pressure deviations in the filter.

2. A method according to claim 1, wherein compressed-air blasts at a reservoir or receiver pressure of 0.8 to 2 bar are used for dedusting.

3. A method according to claim 1, wherein the dedusting of each filter module comprises one compressed-air blast per dedusting cycle per element of the filter module.

4. A method according to claim 1, wherein the compressed-air blasts are directed in the direction of the filter elements.

5. A method according to claim 1, wherein the compressed-air blasts have a duration of less than 300 ms.

6. A method according to claim 1, wherein the filter module to be dedusted is left in the substantially flow-free state for a certain period of time after dedusting.

7. A device for dedusting filters for dust-laden waste gases according to the method set forth in claim 1, comprising a plurality of filter elements vertically arranged in a filter housing and each having an upper, open end and a lower, closed end, at least one supply duct for the dust-laden waste gases and at least one discharge duct for the cleaned waste gases, means for blowing compressed-air blasts at a reservoir or receiver pressure of 0.5 to 3 bar into the open ends of the filter elements, wherein the consumption of compressed air used for dedusting is 0.5 to 4 liters per m² of filter area, wherein the filter is subdivided into a plurality of filter modules each comprising at least one filter element, wherein at least two filter modules are arranged in a filter housing or filter chamber, said filter modules being alternately dedusted, and that each of said filter modules is each associated with a clean-gas discharge duct comprising a shutoff means for the interruption of the clean-gas discharge duct, and a device for controlling the shutoff means to simultaneously effect, during a change-over of the filter modules to be dedusted, the opening of the shutoff means of the already dedusted filter module and the closing of the shutoff means of the filter module to be dedusted, enabling the minimization of any possible pressure deviations in the filter.

8. A device according to claim 7, wherein each filter module comprises a compartment forming a clean-gas space, wherein the compartment is in fluid communication with the discharge duct and at least one filter element.

9. A device according to claim 7, wherein partition elements are provided between two or more filter modules arranged in the filter housing.

10. A device according to claim 7, wherein at least one nozzle is introduced and oriented in the direction open end of each filter element.

11. A device according to claim 10, wherein two nozzles oriented in the direction of the filter element are arranged eccentrically above the open end of each filter element.

12. A device according to claim 7, further comprising an injector is arranged in the open end of each filter element.

13. A device according to claim 11, wherein at least one nozzle is arranged above the open end of each filter element at a distance from the entry opening of the injector.

14. A device according to claim 7, wherein supply duct is arranged below the lower ends of the filter elements of the filter modules.

15. An apparatus comprising:
a supply duct;
a discharge duct;
a compressed-air blaster at a reservoir or receiver pressure of 0.5 to 3 bar, wherein the consumption of compressed air used for dedusting is 0.5 to 4 liters per m² of filter area;
a filter including filter housing having one or more filter chambers, each filter chamber in fluid communication with a supply duct and having two or more filter modules, each filter module in fluid communication with a discharge duet and having a shut-off, an opening for receiving compressed-air blasts, and one or more vertically arranged filter elements having an upper, open end, and a lower, closed end; and
a shut-off controller.

16. A method for dedusting filters using an apparatus including:
a supply duct;
a discharge duct;
a compressed-air blaster at a reservoir or receiver pressure of 0.5 to 3 bar, wherein the consumption of compressed air used for dedusting is 0.5 to 4 liters per m² of filter area;
a filter including filter housing having one or more filter chambers, each filter chamber in fluid communication with a supply duct and having two or more filter modules, each filter module in fluid communication with a discharge duct and having a shut-off, an opening for receiving compressed-air blasts, and one or more vertically arranged filter elements having an upper, open end, and a lower, closed end; and
a shut-off controller,
wherein the method comprises simultaneously opening the shut-off of a first one of the filter modules and closing the shut-off of a second one of the filter modules and exposing the open end of the vertically arranged filter elements contained within the second filter module to compressed-air blasts, wherein pressure fluctuations are minimized within the filter.

* * * * *